March 14, 1939.　　M. P. VARGAS　　2,150,350
POWER MOWER
Filed Aug. 10, 1938　　4 Sheets-Sheet 2
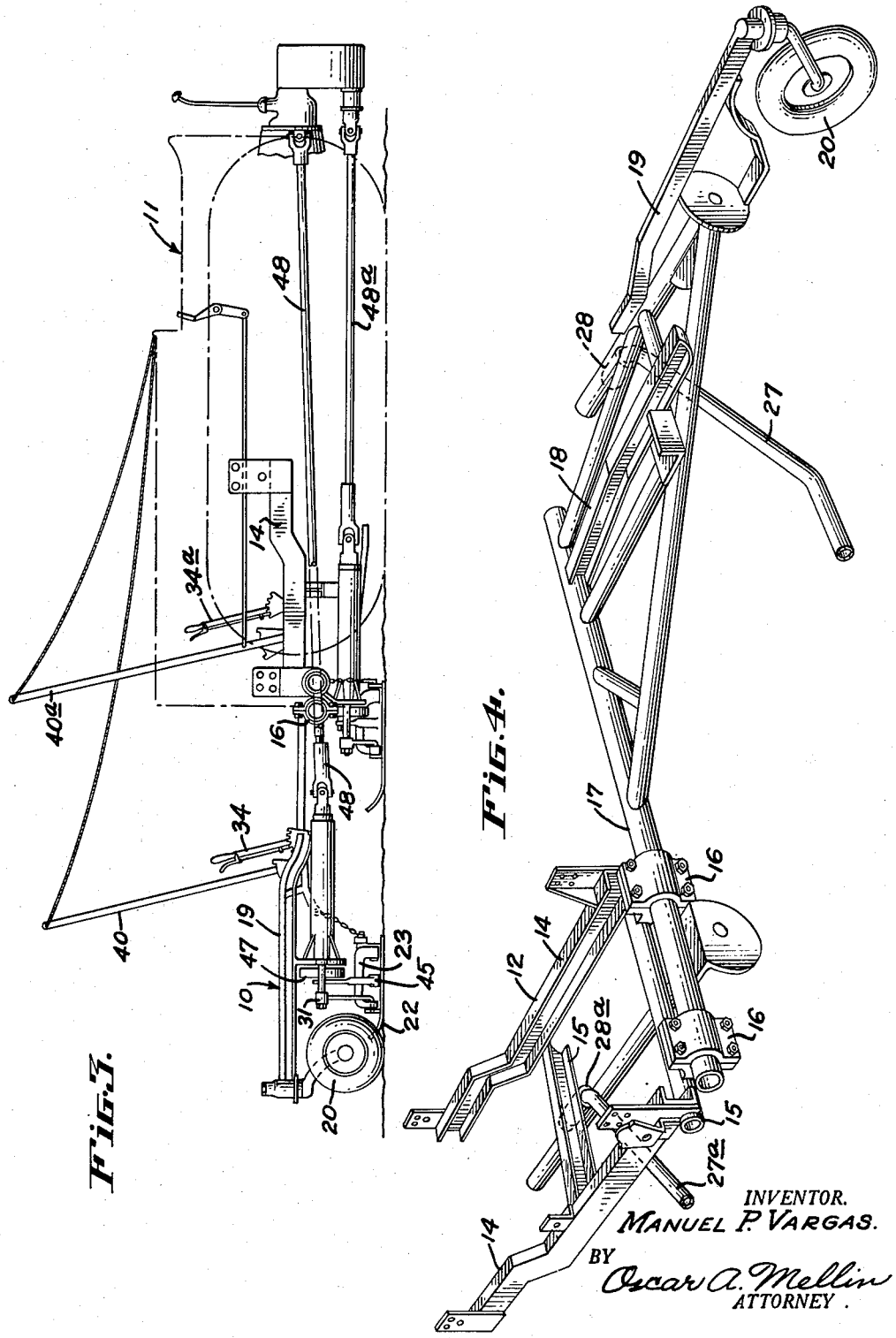
INVENTOR.
MANUEL P. VARGAS.
BY
Oscar A. Mellin
ATTORNEY.

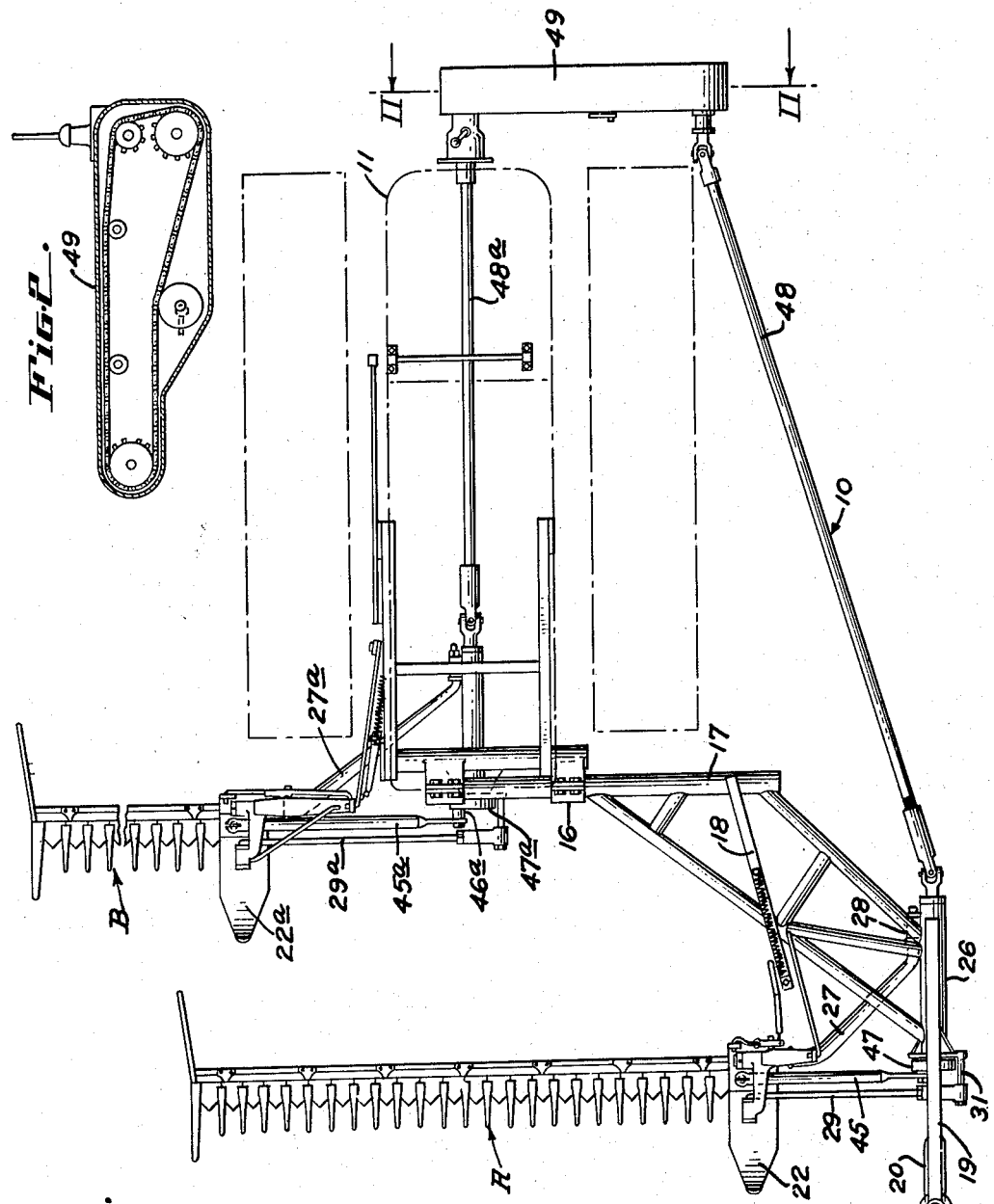

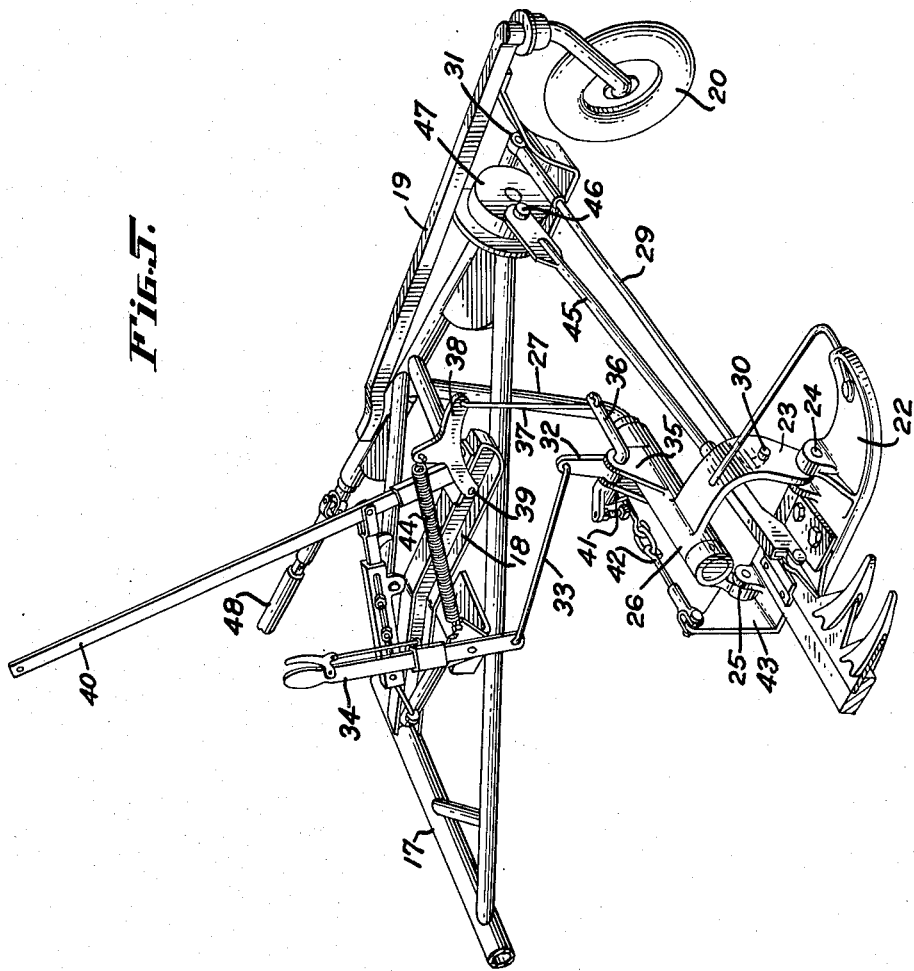

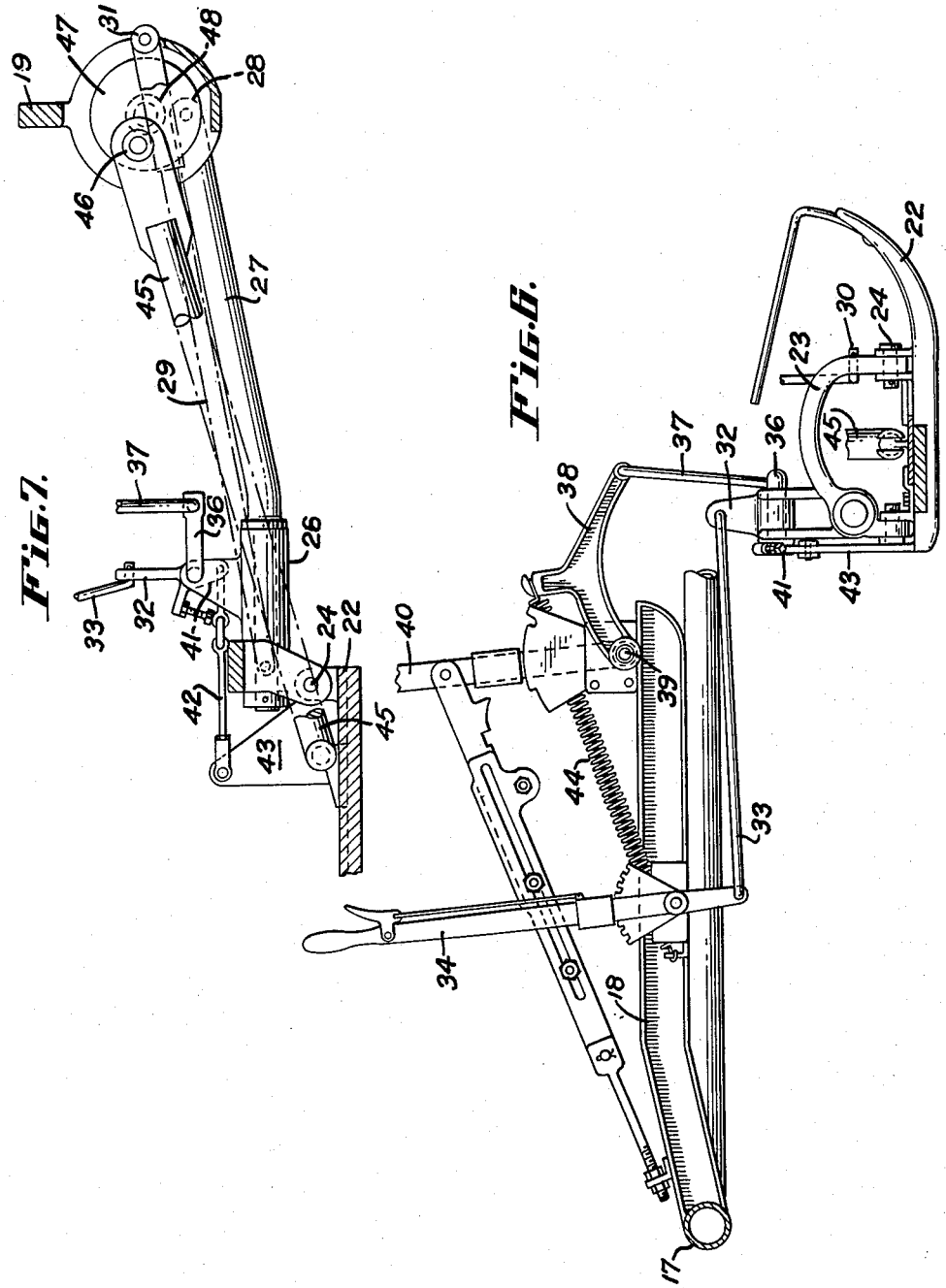

Patented Mar. 14, 1939

2,150,350

UNITED STATES PATENT OFFICE 2,150,350

POWER MOWER.

Manuel P. Vargas, near Livermore, Calif.

Application August 10, 1938, Serial No. 224,044

6 Claims. (Cl. 56—25)

This invention relates to agricultural implements and particularly relates to power driven mowing machines.

It is the principal object of the present invention to provide an improved mowing machine which may be detachably assembled on a conventional tractor as a unit in a manner disposing the cutters transversely of the tractor in advance thereof for maximum efficiency in operation and in maneuvering the machine, and enabling the cutters to be power driven from the power plant of the tractor.

One form which the invention may assume is exemplified in the following description and illustrated by way of example in the accompanying drawings, in which:

Fig. 1 is a plan view of a mowing machine embodying the preferred form of my invention, showing it assembled on a tractor of conventional design, the tractor being indicated by broken lines.

Fig. 2 is a longitudinal sectional view through the transmission mechanism used in power operating the cutters of the mower from the power plant of the tractor.

Fig. 3 is a side elevation of my improved mowing machine, showing the manner in which the same is assembled on a tractor of conventional design, the latter being indicated in broken lines.

Fig. 4 is a perspective view of the framework of my improved mowing machine.

Fig. 5 is a perspective view of a portion of the frame of the mowing machine, and disclosing the manner of connection of one of the cutter assemblies thereto and the mechanism for maneuvering that set of cutters.

Fig. 6 is a fragmentary view, showing the mechanism for changing the angle of the cutters.

Fig. 7 is a fragmentary view of the mechanism for elevating the cutter bars to inoperative position.

Referring more particularly to the accompanying drawings, 10 indicates a power driven mowing machine adapted for use in connection with a conventional type of tractor. The latter is indicated by the numeral 11 and is shown here in broken lines.

The mowing machine includes a main frame 12 comprising two longitudinal members 14 adapted to be detachably bolted or otherwise secured to the chassis of the tractor 11 adjacent the forward end thereof, as illustrated in Figs. 1 and 3. The longitudinal members 14 are suitably connected by transverse members 15, the front one of which carries two bearings 16, which are positioned immediately in front of the chassis frame of the tractor, with their axes extending transversely of the tractor. Received in these bearings 16, and pivotal therein, is the transverse member 17 of a triangular auxiliary frame 18. The transverse member 17 extends laterally of the tractor toward the left side thereof, as illustrated. The frame 18 is provided with a longitudinal frame member 19, arranged longitudinally with respect to the tractor at a spaced distance outwardly from the end of the transverse frame member 17. The transverse member 17 and the longitudinal member 19 of the frame 18 are rigidly connected, as illustrated, to provide a rigid auxiliary frame structure. The outer end of the longitudinal frame member 19 is fitted with a caster wheel 20 to engage the ground. Obviously, as this wheel advances over the ground, the frame 18, being pivotal in the bearings 16, the frame will adjust itself to the contour of the ground at all times.

The frame 18 is equipped with a cutter assembly A, which assembly is conventional in design and well known, and consists, as in standard practice, of a stationary cutter bar rigidly secured at one end to a shoe 22 and extending laterally therefrom transversely of the tractor and considerably in advance of the front end thereof. As in standard practice, a reciprocable cutter bar is guided for reciprocation on the stationary cutter bar, and as this construction forms no part of the present invention, it is not described in detail.

The shoe 22 is provided with a pivotal yoke 23 pivoted to the shoe about a longitudinal axis 24, there being ears 25 on the shoe at spaced distances apart, as illustrated, pivotally connected with the ends of the yoke 23, as illustrated. A transverse bearing 26 is formed on the yoke to rotatably receive one end of a cutter carrier arm 27, which arm is bent at an obtuse angle to the bearing 26 and extending to the longitudinal portion 19 of the frame 18, and then bent so that its end is parallel with this longitudinal portion, which end is journalled in a bearing 28 carried by the frame 18. From this it is obvious that the shoe 22 with its cutter bar mechanism may tilt about the axis of the bearing 26 of the yoke 23, and likewise that the cutter bar mechanism may swing about the axis 24, and further that the entire mechanism may be elevated by turning movement of the cutter bar carrying arm in the bearing 28.

To further connect the yoke 23 with the frame, I provide a radius rod 29 pivotally connected to the yoke as at 30 and to the frame as at 31, the axes of both of these pivot points being longitudinal with respect to the frame 18. Therefore, to angle or tilt the cutter blades, the shoe 22 and the yoke 23 are pivoted about the axis of the bearing 26 by means of an ear 32 on said bearing being connected by means of a connecting rod 33 to the end of an operating lever 34 carried by the frame 18. By operating this lever 34, the shoe 22 with the cutter bars is tilted or angled about the axis of the bearing 26 on the yoke 23.

It is, of course, desirable to enable the entire cutter bar assembly to be elevated from the ground, such as when transporting the machine from place to place. To accomplish this, the bearing 26 of the yoke 23 is provided with bearing ears 35, in which is pivoted a crank lever 36, connected at its outer end to a connecting rod 37 (see Fig. 6). The upper end of this connecting rod 37 is pivotally connected to the outer end of an arm 38 fixed on a shaft 39, to which shaft is also fixed an operating lever 40, so that swinging movement of the operating lever 40 will be accompanied by swinging movement of the arm 38 and vertical movement of the rod 37. This latter movement of this rod 37 will swing the crank lever 36 so that the shaft portion thereof will turn in the bearing ears 35. The end of the shaft portion of the crank lever 36 opposite the latter is formed with a crank lever 40 connected by links 42 to an ear 43 formed as a fixed part of the shoe 22. The pivotal connection between the links 42 and the ear 43 is longitudinal, as illustrated.

Therefore, when the operating lever 40 is swung in a direction moving the connecting rod 37 upwardly, the crank lever 36 will be operated to swing the crank lever 41 to the right in Fig. 7, exerting a pull on the ear 43 through the linkage 42, thereby swinging the shoe 22 about the pivotal axis 24 and causing the outer end of the cutter bar assembly to elevate. It should be stated, however, that at the initial upward movement of the connecting rod 37, the entire shoe and cutter bar assembly will be elevated slightly, due to the mounting of the cutter bar carrier arm 27. This mounting permits the entire assembly to elevate until this carrier arm engages the underside of the frame 18, as illustrated, such engagement preventing further movement upward of the entire assembly so that further and continued upward movement of the connecting rod 27 will be accompanied by upward swinging movement of the outer end of the cutter bar assembly by means of the shoe 22 pivoting about the axis 24 of the yoke 23.

The lever 40 is aided in this elevating movement by means of a tension spring 44 connected at one end to the frame and at the other end to the arm 38.

The construction of the operating levers and the manner of holding them in fixed position, while illustrated, does not form any part of the present invention, the same being more or less conventional in design.

To drive the reciprocable cutter bar of the cutter assembly just described, the same is connected to one end of a pitman rod 45, the other end of which is connected to a crank pin 46 on a disk 47 secured on a shaft 48, best illustrated in Fig. 3. This shaft is journaled in the frame 18 adjacent the disk 47 and extends rearwardly of the tractor along one side thereof, as illustrated in Fig. 1, to a transmission mechanism 49 mounted at the rear of the tractor and driven from the power plant thereof. This transmission mechanism is fully shown in Fig. 2 and from this illustration it will suffice to say that it comprises an endless chain driven directly from the power plant of the tractor and suitably connected with gears driving the shaft 48 and a second drive shaft 48a, illustrated in Fig. 1, for driving the second cutter unit assembly, as will be described. Suitable universal and telescopic joints are interposed in the shaft 48, to enable it to led, as illustrated, from the disk 47 to the transmission, as illustrated in Fig. 1.

It is obvious that when the shaft 48 is driven, that the disk 47 will be revolved and reciprocate the pitman 45, which reciprocation will be transmitted to the movable cutter bar of the cutter assembly to reciprocate the same. In that the connection between the pitman and the cutter bar is universal, the pivotal movement and tilting movement of the cutter assembly is readily permitted.

The second cutter assembly is indicated by B and is positioned transversely of the tractor in front thereof, but not in longitudinal alignment with the cutter assembly A, as illustrated in Fig. 1. The cutter assembly B is spaced forwardly of the tractor and rearwardly of the cutter assembly A. The ends of the two cutter assemblies, however, overlap, as illustrated.

The cutter assembly B is connected with the main frame 12 in identically the same mechanical manner as the cutter assembly A is connected with the auxiliary frame 18. That is to say, that the radius bar 29a is fixed to the main frame 12 in the same manner as the radius bar 29 is fixed to the auxiliary frame 18. Also the pitman 45a of the cutter assembly B is connected to a crank pin 46a fixed eccentrically on a disk 47a on the second drive shaft 48a extending longitudinally of the tractor beneath the same, and driven by the transmission mechanism 49 similarly to the manner in which the drive shaft 48 is driven thereby. The carrier arm 27a of the cutter unit B is connected, as shown in Fig. 4, to the main frame 12 in substantially the same manner as the carrier arm 27 is connected with the auxiliary frame 18. It is also pointed out that operating levers 34a and 40a are carried by the main frame 12 and connected with the cutter assembly B identically in the manner in which the operating levers 34 and 40 are connected with the cutter assembly A.

I desire to state here that the operating levers 40 and 40a are so designed and mounted on the respective frames that they may be operated by cables led to the driver's seat of the tractor so that the elevation of the cutter units from engagement with the ground may be accomplished without the driver's leaving the tractor seat.

In operation of the device, it is constructed and assembled as illustrated in the drawings. If desired, the transmission mechanism 49 may be left mounted on the rear of the tractor frame, as it will not interfere with the normal operation of the tractor, but it, of course, may be removed, if so desired, by merely unbolting it. The shafts 48 and 48a may be quickly detached, due to their construction, from the transmission mechanism. By merely driving the tractor into position with respect to the main frame, the latter may be quickly bolted to the chassis frame of the tractor, and the device after the connection of the shafts 48 and 48a is ready for operation.

It is obvious that being in advance of the tractor, the cutter assemblies A and B will at all times be under the eye of the operator, who may more readily control them than when the same are drawn behind the tractor. Likewise, the mowing cutter assemblies may be maneuvered by the operator of the tractor more readily and more efficiently than can be done by drawing them at the rear of the tractor. It is also apparent that in operation the auxiliary frame 18 will follow the contour of the ground due to its pivotal connection with the forward end of the main frame and its pilot wheel 20 bearing on the ground. It is readily seen that the cutter bar assemblies can be readily tilted by mere manipulation of the levers 34 and 34a, and that the operator, by merely operating the levers 40 and 40a, may raise the entire cutter assemblies a considerable distance from the ground to transport the mower from place to place.

From the foregoing, it is obvious that I have provided a comparatively simple and efficient mowing machine which may be used in conjunction with a standard tractor, and which may be readily assembled or disassembled therefrom to enable the tractor to be used for other purposes when the mowing machine is idle.

While I have shown the preferred form of my invention, it is to be understood that various changes may be made in its construction by those skilled in the art without departing from the spirit of the invention, as defined in the appended claims:

1. A mowing machine comprising a main frame for attachment to the chassis of a tractor, a cutter assembly carried by the main frame and extending laterally therefrom in one direction, an auxiliary frame pivoted to the main frame for free vertical swinging movement, and extending both laterally and forwardly of the main frame, and a cutter assembly carried by said auxiliary frame, a free trailing caster wheel at the forward end of the said auxiliary frame to engage the ground and maintain the auxiliary frame in a definite relationship to the ground.

2. A mowing machine comprising a main frame for attachment to the chassis of a tractor, a cutter assembly carried by the main frame and extending laterally therefrom in one direction, an auxiliary frame pivoted to the main frame for free vertical swinging movement, and extending both laterally and forwardly of the main frame, and a cutter assembly carried by said auxiliary frame, a free trailing caster wheel at the forward end of the said auxiliary frame to engage the ground and maintain the auxiliary frame in a definite relationship to the ground, and means for connection with the power plant of the tractor for operating said cutter assemblies.

3. A mowing machine comprising a main frame for attachment to the chassis of a tractor, a first cutter assembly carried by the main frame and arranged forwardly thereof and extending laterally at one side thereof, an auxiliary frame arranged forwardly of the main frame and at the side thereof opposite the first cutter assembly, the rearmost portion of said auxiliary frame being pivotally connected to the main frame for free vertical swinging movement, and a second cutter assembly carried by said auxiliary frame, a free trailing caster wheel at the forward end of the said auxiliary frame to engage the ground and maintain the auxiliary frame in a definite relationship to the ground.

4. A mowing machine comprising a main frame for attachment to the chassis of a tractor, a first cutter assembly carried by the main frame and arranged forwardly thereof and extending laterally at one side thereof, an auxiliary frame arranged forwardly of the main frame and at the side thereof opposite the first cutter assembly, the rearmost portion of said auxiliary frame being pivotally connected to the main frame for free vertical swinging movement, and a second cutter assembly carried by said auxiliary frame, a free trailing caster wheel at the forward end of the said auxiliary frame to engage the ground and maintain the auxiliary frame in a definite relationship to the ground, and means for connection with the power plant of the tractor for operating said cutter assemblies.

5. In combination, a main frame adapted for attachment to the chassis of a tractor, an auxiliary frame horizontally pivoted to said main frame for free vertical swinging movement and extended forwardly from its pivotal axis, a cutter assembly carried by the free end portion of said auxiliary frame, and a free trailing caster wheel carried by said auxiliary frame in advance of said cutter assembly and adapted when propelled over uneven ground to vertically swing the auxiliary frame relative to said main frame.

6. A mowing machine comprising a main frame for attachment to the forward end of the chassis of a tractor, an auxiliary frame pivoted to the main frame for vertical swinging movement and extending both laterally and forwardly of said main frame, a cutter assembly carried by said auxiliary frame, actuating means for said cutter assembly including a drive shaft extending rearwardly to the rear end of said tractor, and transmission means disposed at the rear end of the tractor and operatively connecting the rear end of said drive shaft with the power plant of said tractor.

MANUEL P. VARGAS.